United States Patent [19]

Takahashi et al.

[11] Patent Number: 4,794,049
[45] Date of Patent: Dec. 27, 1988

[54] ELECTRODE SUPPORTING CONDUIT TUBE FOR ELECTRICAL HEATING OR UNDERGROUND HYDROCARBON RESOURCES

[75] Inventors: Ichiro Takahashi, Suita; Goro Okamoto, Itami; Kazuo Okahashi, Toyonaka, all of Japan

[73] Assignee: Mitsubishi Denki Kabushiki Kaisha, Tokyo, Japan

[21] Appl. No.: 6,346

[22] Filed: Jan. 14, 1987

Related U.S. Application Data

[63] Continuation of Ser. No. 837,662, Mar. 7, 1986, abandoned, which is a continuation of Ser. No. 580,428, Feb. 15, 1984, abandoned.

[30] Foreign Application Priority Data

Feb. 16, 1983 [JP] Japan .................... 58-25595
Jun. 17, 1983 [JP] Japan .................... 58-109650

[51] Int. Cl.$^4$ .................... B32B 15/08; F16L 9/14
[52] U.S. Cl. .................... 428/460; 428/34.5; 138/145
[58] Field of Search .................... 428/36, 460; 138/145; 174/110 R, 110 E

[56] References Cited

U.S. PATENT DOCUMENTS

| 3,946,809 | 3/1976 | Hagedorn . | |
|---|---|---|---|
| 4,192,697 | 3/1980 | Becker et al. | 156/188 |
| 4,320,224 | 3/1982 | Rose et al. | 528/125 |
| 4,360,630 | 11/1982 | Smith | 524/592 |
| 4,394,417 | 7/1983 | Hilker | 428/383 |
| 4,421,588 | 12/1983 | Davies | 156/308.2 |
| 4,577,664 | 3/1986 | Takahashi et al. | 138/149 |

FOREIGN PATENT DOCUMENTS 1022062 12/1977 Canada .

OTHER PUBLICATIONS

Modern Plastics Encyclopedia, 1983–1984, pp. 54 and 489.

Primary Examiner—John E. Kittle
Assistant Examiner—P. J. Ryan
Attorney, Agent, or Firm—Oblon, Fisher, Spivak, McClelland, & Maier

[57] ABSTRACT

An electrode supporting conduit tube for electrical heating of underground hydrocarbon resources comprises a metal conduit tube; and an insulative covering adhered on and around the outer peripheral surface of the metal conduit tube, the insulative covering being a laminated body of polyether/ether/ketone resin and glass fiber, which is obtained by confining both polyether/ether/ketone resin and glass fiber wound on and around the metal conduit tube within a metal mold and subjecting the laminated materials to shaping under heat and pressure at a heating temperature of from 350° C. to 450° C. and a pressure of from 10 to 200 kg/cm$^2$.

3 Claims, 2 Drawing Sheets

FIGURE 1
FIGURE 2
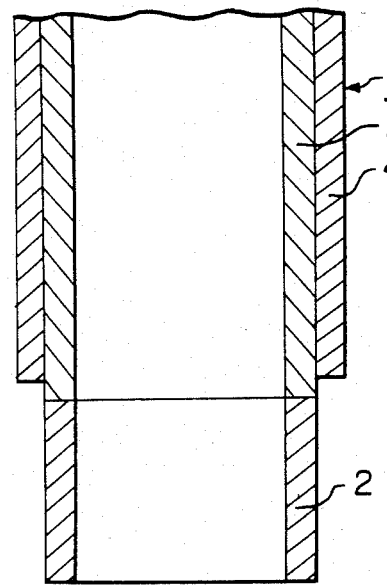
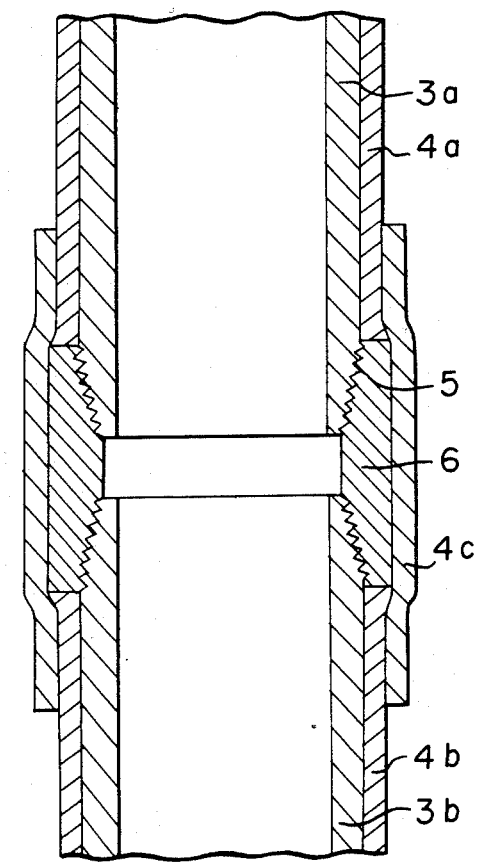

FIGURE 3
FIGURE 4
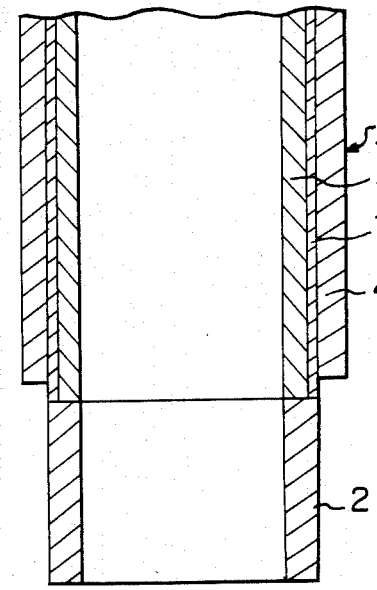
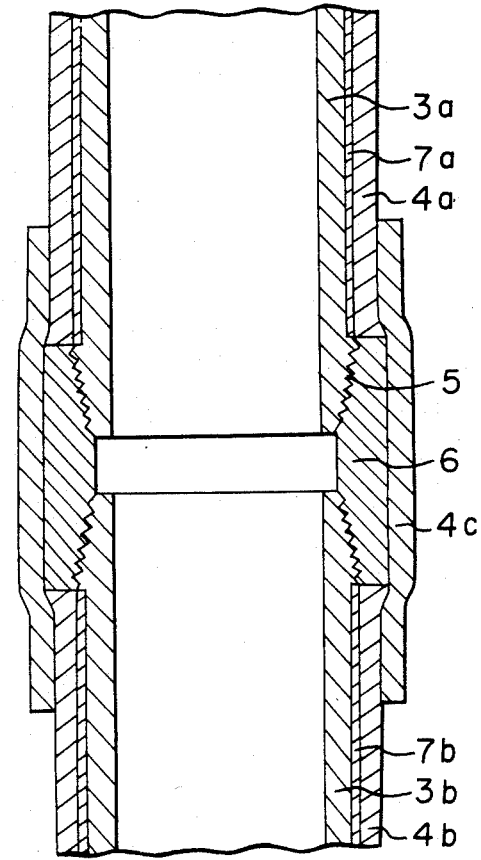

ELECTRODE SUPPORTING CONDUIT TUBE FOR ELECTRICAL HEATING OR UNDERGROUND HYDROCARBON RESOURCES

This application is a continuation of abandoned application Ser. No. 837,662, filed Mar. 7, 1986, which is a continuation of abandoned parent application Ser. No. 580,428, filed Feb. 15, 1984.

This invention relates to an electrode supporting conduit tube for electrically heating underground hydrocarbon resources. More particularly, the present invention is concerned with an electrode supporting conduit tube for electrical heating of such underground hydrocarbon resources, which is covered with electrically insulating materials and is used when the underground hydrocarbon resources are to be extracted by means of the electrical heating method.

Throughout the present specification, the term "underground hydrocarbon resources" refers to bituminous substances contained in oil sand or tar sand, hence it will be called hereinafter "oil sand", unless otherwise specified.

In recent years, with steep rise in price of the oil resources, extraction of the oil content from deposit of oil sand laid under the ground in Canada, Venezuela, and some other countries has been being put into operations in full scale. The deposit of oil sand usually exists under the ground as deep as a few to several hundred meters and in thickness of approximately 50 meters or so. However, since this oil sand is highly viscous, it can not be taken out of the earth by pumping up operation at a normal temperature. It has therefore been a practice so far to employ a method, by which heated water vapor is ejected into and through the oil sand deposit to raise the temperature of the oil content in the deposit and lower its viscosity, thereby enabling the oil content to be pumped up.

This method, however, is so poor in its operating efficiency that it inevitably pushes up the operating cost for the extraction. On account of such shortcoming in the conventional method of extraction, there has been proposed a method of oil extraction with better operating efficiency and higher productivity, according to which a pair of conduit tubes of steel or stainless steel with an electrode part being attached to the bottom end part of each of them are buried deep under the ground so that the electrode part may arrive at the oil sand deposit, while they are separated each other at a distance in a range of from about 30 to 200 meters; and then a high tension voltage of from several hundreds to several thousands volts is applied across the two electrodes to raise the temperature of the oil sand deposit which the Joule heat so as to reduce viscosity of the oil sand.

In this latter method of oil extraction, since the oil sand deposit has resistivity which is several times as high as that of the ground stratum above the deposit, it is imperative that the portion of the conduit tube to be buried in the ground stratum be covered with an electrically insulating material so as to permit electric current to flow in and through the ground layer above the oil sand deposit. Unless this portion of the conduit tube is covered with the electrically insulating material, electric current flows in and through the ground layer alone, and no current flows across the electrodes buried in the oil sand deposit. As the consequence of this, there have been rising demands for development of the electrode supporting conduit tube covered with the electrically insulating material and being capable of withstanding such special conditions in its use.

The characteristics, which the electrically insulating material should possess, are as follows:

(a) it has a voltage withstand characteristic of from several hundreds to several thousands volts and a volume resistivity value of $10^6$ ohm-cm above not only at a normal temperature level, but also at a temperature level of about 300° C., at which visocsty of the oil content in the oil sand deposit can be decreased;

(b) it is durable against hot water of approximately 300° C. in order that water contained in the oil sand deposit may be heated to a temperature of about 300° C., at which viscosity of the oil sand deposit can be decreased; and (c) it has a mechanical strength of such a degree that can support the electrode from the bottom end part of the conduit tube with the electrically insulating material being provided around it, and also has a mechanical impact strength of such a degree that does not bring about breakage of the electrically insulating material around the conduit tube by its contact with the wall of the bore-hole, when the electrode supported on and suspended from the bottom end part of the conduit tube is buried into the oil sand deposit through a bore-hole for burying.

The present invention has been made with a view to satisfying the above-described various requirements, and aims at providing an electrode supporting conduit tube for electrically heating the underground hydrocarbon resources, which is provided thereon with an electrically insulative covering excellent in its voltage withstand characteristic, heat-resistant property, and mechanical strength.

According to the present invention, in general aspect of it, there is provided an electrode supporting conduit tube for electrical heating of underground hydrocarbon resources, which comprises: a metal conduit tube; and an electrically insulative covering adhered on and around the outer peripheral surface of the metal conduit tube, the insulative covering being a laminated body of polyether/ether/ketone resin and glass fiber, which is obtained by confining both polyether/ether/ketone resin and glass fiber within a metal mold and shaping the laminated material under heat and pressure at a heating temperature of from 350° C. to 450° C., and a pressure of from 10 to 200 kg/cm$^2$.

The foregoing object, other objects as well as the specific materials used and manner of forming the laminated insulative covering according to the present invention will become more apparent and understandable from the following detailed description of preferred examples thereof, when read in conjunction with the accompanying drawing.

In the drawing:

FIG. 1 is a longitudinal cross-sectional view, in part, showing the bottom end part of the electrode supporting conduit tube covered with the electrically insulating material, according to the first embodiment of the present invention;

FIG. 2 is a longitudinal cross-sectional view showing a joint portion of the electrode supporting conduit tubes shown in FIG. 1;

FIG. 3 is a longitudinal cross-sectional view, in part, showing the second embodiment of the present invention; and FIG. 4 is a longitudinal cross-sectional view showing a joint portion of the conduit tube shown in FIG. 3.

In the following, the present invention will be described in detail with reference to a couple of preferred embodiments thereof.

For polyether/ether/ketone resin to be used for the present invention, there may be exemplified, for example, aromatic polyether/ether/ketones developed by Imperial Chemical Industries, ltd., England, which can be represented by the following structural formula:

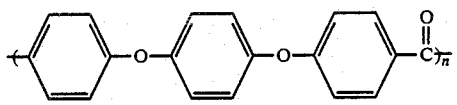

In the first embodiment of the present invention, polyether/ether/ketone resin is used in the form of a film having thickness of from 0.01 to 0.20 mm, or preferably from 0.02 to 0.10 mm. When the film thickness is less than 0.01 mm, the film is prone to be readily broken by tension applied to it, when it is wound on and around the conduit tube in an attempt not to produce any clearance between the film layers or between the film layer and the glass fiber layer with the consequent inability of tightly winding the film around the metal conduit tube. On the other hand, when the film thickness is more than 0.20 mm, elastic repulsive force of the film increses to make it difficult to wind the film on and around the conduit tube in close contact with it. As the consequence of this, there is formed a clearance between the film layers or between the film layer and the glass fiber layer to entrap air bubbles in the interior of the laminated layers of the insulating material at the time of applying heat and pressure to them, whereby it becomes impossible to obtain the insulative covering excellent in the hot water resistant property and the electrical characteristics.

For the glass fiber, there is used a glass fiber which contains therein 90% or more of silica. In case the silica content in the glass fiber is below 90%, the surface of the glass fiber is melted with hot water of 300° C. to result in lowering of a volume resistivity and mechanical strength of the electrically insulating material.

For the metal conduit tube, there may preferably be used steel tube, or stainless steel tube, or the like which is excellent in its anti-corrosive property and has good electrical conductivity. While length of the conduit tube is determined by depth of the oil sand deposit existing under the ground, it is usual that a length of from 200 m to 600 m, or so is required.

In the following, explanations will be given as to the manufacturing process of the electrode supporting conduit tube according to the present invention.

At first, polyether/ether/ketone resin film and glass fiber with the silica content therein of 90% and above are alternatively wound on and around the metal conduit tube, after which pressure of from 10 to 200 kg/cm² is applied over the entire outer peripheral surface of the tube by use of a metal mold, while heating the tube with the resin film and the glass fiber wound around it to a temperature level of from 350° C. to 450° C. to melt the polyether/ether/ketone resin to be fused with the glass fiber, whereby the insulative convering can be formed.

If the heat-melting temperature is lower than 350° C., the polyether/ether/ketone resin is not impregnated into the glass fiber interior, since the melt-viscosity of the resin is high, whereby it is not possible to obtain the insulative covering excellent in its hot-water resistant property and electrical characteristics. On the other hand, if the heat-melting temperature is higher than 450° C., there takes place heat deterioration with the polyether/ether/ketone resin, whereby it is also not possible to obtain the insulative covering excellent in its hot-water resistant property, mechanical strength, and electrical characteristics.

Note by the above-mentioned mode of embodiment, when the insulative covering of polyether/ether/ketone resin is formed on the outer peripheral surface of the metal conduit by directly winding the resin film alone on and around the metal conduit tube and then heat-melting the film-forming material at a temperature of from 350° C. to 450° C., there takes place a large internal stress at the fusion-bonded surface between the metal conduit tube and the covering on account of large difference in the expansion coefficient between the metal conduit tube and the insulative covering, whereby the adhering force between them lowers. Thus, when the metal conduit tube with the film of polyether/ether/ketone resin alone having been wound on and around the outer peripheral surface thereof is subjected to hot water cycle of 25° C. and 300° C. in water, the covering of polyether/ether/ketone resin comes off the surface of the metal conduit tube, which can serve no practical purpose.

In contrast to this, the insulative covering according to the present invention formed on the metal conduit tube by alternately winding the film of polyether/ether/ketone resin and the glass fiber with the silica content therein of 90% and above on and around the outer peripheral surface of the metal conduit tube, and thereafter confining the outer peripheral surface thereof in a metal mold and subjected the laminated materials to shaping by applying heat and pressure thereto at a predetermined temperatrue and under a predetermined pressure has a small difference in the expansion coefficient from that of the metal conduit tube, and moreover has a large mechanical strength, on account of which it can well withstand the hot-water cycle of 25° C. and 300° C. in water, hence it is suited as the insulative covering for the metal conduit tube of the heating electrode device for the oil sand deposit.

In the following, explanations will be given in reference to the accompanying drawings as to the electrode supporting conduit tube having the electrically insulative covering according to the first embodiment of the present invention.

FIG. 1 illustrates the bottom end part of the electrode supporting conduit tube covered with the electrically insulating material, in which the insulative covering 4 formed by the above-mentioned process steps is provided on the outer peripheral surface of the metal conduit tube 3 with an electrode 2 being joined and supported thereron.

In general, the metal conduit tube is required to have a length of from approximately 200 m to 600 m. However, since ordinary steel tube and stainless steel tube have a length per piece of 5 to 50 m, when its bottom end part is to be inserted deep into the oil sand deposit, a plurality of conduit tubes have to be sequentially joined and forwarded into the oil sand deposit.

FIG. 2 illustrates a joint section of the metal conduit tubes covered with the electrically insulating film. As illustrated, when the metal conduit tube 3a provided with the insulative covering 4a and the metal conduit tube 3b provided with the electrically insulative covering 4b are to be joined together, the distal end part of each of the metal conduit tubes 3a and 3b is screw-threaded in a taper shape as designated by a reference numeral 5, after which both conduit tubes are joined together by use of a coupling 6. In this case, the joint section (i.e. the outer peripheral surface of the coupling 6 and each end part of the metal conduit tubes) is further covered with the insulating film 4c to perfectly enshroud the joined portion so as to prevent current leakage from the portion.

Further detailed explanations will be given as to the method of covering the metal conduit tube with the insulating film 4, 4a, 4b, or 4c as well as the properties of such insulating film in reference to various actual examples of the present invention and comparative examples, though the invention is not limited to these examples alone.

EXAMPLE 1

A strip of tape having thickness of 0.05 mm and width of 30 mm and made of polyether/ether/ketone resin film was wound half-lap on and around the outer peripheral surface of a metal conduit tube for two winding turns. Over and around this resin film, there was also wound half-lap another strip of tape of glass fiber with the silica content therein of 90% and above, and having thickness of 0.20 mm and width of 30 mm for a single winding turn. The winding operation of these strips of tape of polyether/ether/ketone resin film and tape of glass fiber was carried out for additional four times, thus repeating the winding operation for five times in all. Over and around this glass fiber tape, there was further wound for two winding turns the polyether/ether/ketone resin film of 0.05 mm thick and 30 mm wide. In this way, composite layers of polyether/ether/ketone resin film and glass fiber were formed on the outer peripheral surface of the metal conduit tube to a thickness of 3.2 mm. Subsequently, the metal conduit tube with the composite layers having been wound around it was confined in a quartered metal mold, and then it was subjected to heating in an electric furnace of 380° C. under pressure of 50 kg/cm², thereby forming on the metal conduit tube a composite insulative covering of polyether/ether/ketone resin and glass fiber with the silica content therein of 90% and above.

The columns for Example 1 in Table 1 below indicate the adhesive strength (kg/cm²) and the voltage withstand value (kV/mm) of the thus obtained insulative covering at 25° C.; and also the adhesive strength (kg/cm²) and the voltage withstand value (kV/mm) of the same insulative covering measured at 25° C. after it was subjected to hot water cycle for five repeated cycles with the process steps of immersing the insulative covering in water, heating it to 300° C., maintaining the covering in hot water of 300° C. for 100 hours, and cooling it down to 25° C. having been made one cycle.

EXAMPLES 2 TO 8

The same experiments as in Example 1 above were conducted, with the exception that structures and shaping conditions of the composite insulative layer were varied by those as shown in Table 1 below, thereby forming the electrically insulative covering on the outer peripheral surface of the metal conduit tube. The characteristics of the thus obtained insulative covering are shown in the columns for Examples 2 to 8 in Table 1.

COMPARATIVE EXAMPLES 1 TO 4

The same experiments as done in Example 1 above were conducted with the exception that structures or shaping conditions of the composite insulative layer were varied by those as shown in Table 1, thereby forming the electrically insulative covering on the outer peripheral surface of the metal conduit tube under the conditions outside the range of the present invention. The characteristics of the thus obtained insulative covering are shown in the columns for Comparative Examples 1 to 4, in Table 1 below.

COMPARATIVE EXAMPLE 5

A strip of tape of polyether/ether/ketone resin film alone having thickness of 0.05 mm and width of 30 mm was wound half-lap on and around the outer peripheral surface of a metal conduit tube for 30 winding turns, and then the outer peripheral surface of the laminated materials was confined in a metal mold and subjected to shaping by application of heat and pressure of 380° C. and 50 kg/cm², respectively, thereby forming on the outer peripheral surface of the metal conduit tube the insulative covering of polyether/ether/ketone resin alone. The characteristics of the thus obtained insulative covering are shown in the columns for Comparative Example 5 in Table 1.

COMPARATIVE EXAMPLES 6 TO 9

The experiments were conducted in the same manner as in Example 1 above with the exception that a strip of tape of glass fiber with the silica content therein of below 90% was used in place of the strip of tape of glass fiber with the silica content of 90% and above. The characteristics of the thus obtained insulative covering are shown in the columns for Comparative Examples 6 to 9 in Table 2 below.

TABLE 1

| | Structure | | | | | | | Characteristics | | | |
|---|---|---|---|---|---|---|---|---|---|---|---|
| | Film | | Glass Fiber | | Winding | Shaping Conditions | | Initial Value | | Hot Water Cycle (After 5 Cycles) | |
| Example No. | Thickness (mm) | Number of Winding Turn (times) | Thickness (mm) | Number of Winding Turn (times) | Operation Number of Repetition (times) | Temp. (°C.) | Pressure (kg/cm²) | Adhesive Strength (kg/cm²) | Voltage Withstand (kV/mm) | Adhesive Strength (kg/cm²) | Voltage Withstand (kV/mm) |
| 1 | 0.05 | 2 | 0.20 | 1 | 5 | 380 | 50 | 220 | 30 | 200 | 28 |
| 2 | 0.05 | 4 | 0.40 | 1 | 3 | 380 | 50 | 210 | 31 | 190 | 28 |
| 3 | 0.02 | 4 | 0.20 | 1 | 6 | 380 | 50 | 205 | 29 | 180 | 27 |
| 4 | 0.10 | 1 | 0.20 | 1 | 5 | 380 | 50 | 190 | 32 | 170 | 29 |
| 5 | 0.05 | 2 | 0.20 | 1 | 5 | 350 | 50 | 200 | 28 | 185 | 25 |
| 6 | 0.05 | 2 | 0.20 | 1 | 5 | 450 | 50 | 208 | 31 | 190 | 26 |
| 7 | 0.05 | 2 | 0.20 | 1 | 5 | 380 | 180 | 225 | 33 | 200 | 27 |
| 8 | 0.05 | 2 | 0.20 | 1 | 5 | 380 | 20 | 185 | 28 | 170 | 25 |
| Compara- | 0.05 | 2 | 0.20 | 1 | 5 | 330 | 100 | 170 | 27 | 60 | 10 |

TABLE 1-continued

| | Structure | | | | | | | Characteristics | | | |
|---|---|---|---|---|---|---|---|---|---|---|---|
| | Film | | Glass Fiber | | Winding | Shaping | | Initial Value | | Hot Water Cycle (After 5 Cycles) | |
| Example No. | Thickness (mm) | Number of Winding Turn (times) | Thickness (mm) | Number of Winding Turn (times) | Operation Number of Repetition (times) | Temp. (°C.) | Pressure (kg/cm$^2$) | Adhesive Strength (kg/cm$^2$) | Voltage Withstand (kV/mm) | Adhesive Strength (kg/cm$^2$) | Voltage Withstand (kV/mm) |
| tive Example 1 | | | | | | | | | | | |
| Comparative Example 2 | 0.05 | 2 | 0.20 | 1 | 5 | 480 | 50 | 200 | 28 | 50 | 8 |
| Comparative Example 3 | 0.05 | 2 | 0.20 | 1 | 5 | 380 | 0 | 150 | 22 | 30 | 12 |
| Comparative Example 4 | 0.30 | 1 | 0.20 | 2 | 3 | 380 | 50 | 160 | 18 | 20 | 10 |
| Comparative Example 5 | 0.05 | 30 | — | — | — | 380 | 50 | 200 | 33 | 0 (Exfoliated) | No measurement could be done |

TABLE 2

| Comparative Example No. | Kind of Glass Fiber | Content of Silica (%) | Initial Value | | Hot Water Cycle (after 5 cycles) | |
|---|---|---|---|---|---|---|
| | | | Adhesive Strength (kg/cm$^2$) | Voltage Withstand (kV/mm) | Adhesive Strength (kg/cm$^2$) | Voltage Withstand (kV/mm) |
| 6 | E Glass | 54.0 | 220 | 32 | 70 | 14 |
| 7 | S Glass | 61.3 | 210 | 33 | 60 | 12 |
| 8 | C Glass | 65.0 | 215 | 34 | 75 | 16 |
| 9 | A Glass | 72.0 | 220 | 33 | 50 | 10 |

As is apparent from the results as shown in Tables 1 and 2 above, the electrode supporting conduit tube with the electrically insulative covering being formed thereon in accordance with the first embodiment of the present invention is excellent in the electrical, mechanical, and hot-water resistant properties owing to the particular material used as well as construction of the insulative covering. Therefore, the electrode supporting conduit tube obtained by the afore-described manner is effectively suited for use in extracting the underground hydrocarbon resources by the electrical heating method.

FIGS. 3 and 4 illustrate the second embodiment according to the present invention. The point of difference in this embodiment from the above-described first embodiment is that a metal covering 7, or 7a and 7b are formed between the metal conduit tube 3 and the insulative covering 4, or between the metal conduit tubes 3a and 3b and the insulative coverings 4a and 4b. In this embodiment, a metal coating layer of nickel, aluminum, chromium, silicon, iron, and other metal materials, or alloys of these metal materials is formed on the surface of the metal conduit tube 3, or 3a and 3b by the melt-plating method, after which the lamination of polyether/ether/ketone resin film and glass fiber film as has been explained in the first embodiment is formed on this metal coating, whereby the electrically insulative covering having the above-mentioned characteristics can be obtained.

As the method for melt-plating to be adopted for forming the metal coating, there may be generally employed the gas type melt-plating method or the gas explosion type melt-plating method which combustion flame of oxygen and fuel (such as acetylene, propane, hydrogen, and so on) as the heat source; or the arc type melt-plating method with electric energy as the heat source; or the plasma jet melt-plating method; or the high frequency induction type melt-plating method. By these methods of melt-plating, it is possible to form the metal coating on the outer peripheral surface of the metal conduit tube with high temperature metal particles being deposited thereon.

As the material for the metal coating to be used in the present invention, there may be listed those metal materials of a kind different from that constituting the metal conduit tube. These metal materials are: nickel (Ni), aluminum (Al), chromium (Cr), silicon (Si), iron (Fe), etc., and alloys of these metal materials such as nickel-/aluminum alloy (Ni-Al), nickel/chromium alloy (Ni-Cr), silica/aluminum alloy (Si-Al), and so forth. These metal materials are employed for the melt-plating in the form of powder or rod.

In the following, explanations will be given as to the second embodiment of the electrode supporting conduit tube according to the present invention.

EXAMPLE 9

The same experiment as done in Example 1 above was conducted with the exception that powder of nickel was spray-coated on the surface of the metal conduit tube by the plasma jet type melt-plating method, thereby obtaining the metal conduit tube with the nickel coating of 0.1 mm thick having formed thereon. The characteristics of the thus obtained insulative covering are shown in Table 3 below in the columns for Example 9.

EXAMPLES 10 TO 18

The same experiments as in Example 9 above were conducted with the exception that the metal coatings were replaced by those shown in Table 3 below, whereby the electrically insualtive covering was formed on the outer peripheral surface of the conduit tube. The characteristics of the thus obtained electrically insulative covering are shown in the columns for Examples 10 to 18 in Table 3.

covering 4 into water to be heated to 300° C., maintaining it in the hot-water of 300° C. for 100 horus, and then cooling it down to 25° C. having been made "one cycle".

TABLE 3

| Example No. | Metal Coating | Film Thickness of Metal Coating (mm) | Initial Value | | Hot-Water Cycle (After 5 Cycles) | |
|---|---|---|---|---|---|---|
| | | | Adhesive Strength (kg/cm$^2$) | Voltage Withstand (kV/mm) | Adhesive Strength (kg/cm$^2$) | Voltage Withstand (kV/mm) |
| 9 | Nickel | 0.1 | 250 | 32 | 220 | 27 |
| 10 | Nickel | 0.06 | 260 | 31 | 240 | 27 |
| 11 | Nickel | 0.2 | 230 | 30 | 210 | 26 |
| 12 | Aluminum | 0.1 | 200 | 32 | 180 | 28 |
| 13 | Chromium | 0.1 | 210 | 28 | 180 | 26 |
| 14 | Silicon | 0.1 | 240 | 27 | 220 | 25 |
| 15 | Iron | 0.1 | 230 | 29 | 190 | 27 |
| 16 | Nickel/Aluminum | 0.1 | 260 | 33 | 220 | 30 |
| 17 | Nickel/Chromium | 0.1 | 220 | 30 | 180 | 28 |
| 18 | Silica/Aluminum | 0.1 | 230 | 31 | 200 | 29 |

In third embodiment of the electrode supporting conduit tube according to the present invention has the electrically insulative covering formed on the outer peripheral surface of the metal conduit tube of the construction as shown in FIGS. 1 to 4 by winding glass fiber film impregnated therein with polyether/ether/ketone resin. In the following, actual examples of manufacturing such electrode supporting conduit tube are presented.

EXAMPLE 19

A strip of tape having thickness of 0.2 mm and width of 30 mm, made of glass fiber with the silica content therein of 90% and in which polyether/ether/ketone resin had been impregnated with the resin content of 50% by weight was wound half-lap for eight winding turns on the outer peripheral surface of the metal conduit tube 3, thereby forming a layer of the tape of 3.2 mm thick. Subsequently, the metal conduit tube 3 having the layer of the tape wound on and around the outer peripheral surface thereof was confined in the quartered metal mold, followed by application of a pressure of 50 kg/cm$^2$ in an electric furnace at a temperature of 400° C., thereby forming the electrically insualtive covering 4 consisting of a composite body of polyether/ether/ketone resin and silica glass fiber with the silica content therein of 90% on the outer peripheral surface of the metal conduit tube.

The columns for Example 19 in Table 4 below indicate the adhesion strength (kg/cm$^2$) and the voltage withstand (kV/mm) of the thus obtained electrically insulative covering 4 at 25° C.; and also the adhesion strength (kg/cm$^2$) and the voltage withstand of the same electrically insulative covering 4 measured at 25° C. after it was subjected to the hot-water cycle for five times with the process steps of immersing the insulative

EXAMPLES 20 TO 32

The same experiment as in Example 19 above were conducted with the exception that the construction and the shaping conditions of the tape layer were varied as shown in Table 4 below, thereby forming the electrically insulative member consisting of a composite body on the outer peripheral surface of the metal conduit tube 3. The characteristics of the thus obtained electrically insulative covering 4 are shown in the columns for Examples 20 to 32 in Table 4.

COMPARATIVE EXAMPLES 10 TO 15

The same experiments as in Example 19 above were conducted with the exception that the construction and shaping conditions of the tape layer were varied, thereby forming the electrically insulative covering on the outer peripheral surface of the metal conduit tube under the shaping conditions outside the range of the present invention. The characteristics of the thus obtained electrically insulative covering are shown in the columns for Comparative Examples 10 to 15 in Table 4.

COMPARATIVE EXAMPLE 16

The electrically insualtive covering consisting of polyether/ether/ketone resin alone was formed on the outer peripheral surface of a metal conduit tube by first winding half-lap a strip of tape of polyether/ether/ketone resin having a thickness of 0.05 mm and a width of 30 mm for 30 winding turns on and around the outer peripheral surface of the metal conduit tube, then the metal conduit tube with the resin tape wound thereon was confined in a metal mold to be subjected to shaping under heat and pressure of 380° C. and 50 kg/cm$^2$, respectively. The characteristics of the thus obtained electrically insulative covering are shown in the columns for Comparative Example 16 in Table 4.

TABLE 4

| | Structure of Electrically Insulative Covering | | | | | | |
|---|---|---|---|---|---|---|---|
| Example No. | Kind of Glass Fiber | Silica Content (%) | Tape Thickness (mm) | Content of Polyether/ Ether/ Ketone (wt. %) | Number of Winding Turn (times) | Shaping Conditions | |
| | | | | | | Temp. (°C.) | Pressure (kg/cm$^2$) |
| 19 | Silica Glass | 90 | 0.2 | 50 | 8 | 400 | 50 |
| 20 | Silica Glass | 90 | 0.2 | 50 | 8 | 450 | 50 |
| 21 | Silica Glass | 90 | 0.2 | 50 | 8 | 350 | 50 |
| 22 | Silica Glass | 90 | 0.2 | 50 | 8 | 400 | 10 |

TABLE 4-continued

| | | | | | | | |
|---|---|---|---|---|---|---|---|
| 23 | Silica Glass | 90 | 0.2 | 50 | 8 | 400 | 200 |
| 24 | Silica Glass | 90 | 0.2 | 30 | 8 | 400 | 50 |
| 25 | Silica Glass | 90 | 0.2 | 70 | 8 | 400 | 50 |
| 26 | Silica Glass | 90 | 0.05 | 60 | 32 | 400 | 50 |
| 27 | Silica Glass | 90 | 0.4 | 50 | 4 | 400 | 50 |
| 28 | Quartz Glass | 100 | 0.2 | 50 | 8 | 400 | 50 |
| 29 | E Glass | 54 | 0.2 | 50 | 8 | 400 | 50 |
| 30 | S Glass | 64 | 0.2 | 50 | 8 | 400 | 50 |
| 31 | C Glass | 65 | 0.2 | 50 | 8 | 400 | 50 |
| 32 | A Glass | 72 | 0.2 | 50 | 8 | 400 | 50 |
| Comparative Example 10 | Silica Glass | 90 | 0.2 | 50 | 8 | 470 | 50 |
| Comparative Example 11 | Silica Glass | 90 | 0.2 | 50 | 8 | 330 | 50 |
| Comparative Example 12 | Silica Glass | 90 | 0.2 | 50 | 8 | 400 | 5 |
| Comparative Example 13 | Silica Glass | 90 | 0.2 | 50 | 8 | 400 | 300 |
| Comparative Example 14 | Silica Glass | 90 | 0.2 | 20 | 8 | 400 | 50 |
| Comparative Example 15 | Silica Glass | 90 | 0.2 | 80 | 8 | 400 | 50 |
| Comparative Example 16 | — | | 0.05 Polyether/ether/ketone resin tape | 100 | 30 | 380 | 50 |

| | Characteristics | | | |
|---|---|---|---|---|
| | Initial Values | | Hot Water Cycle (After 5 Cycle) | |
| Example No. | Adhesive Strength (kg/cm$^2$) | Voltage Withstand (kV/mm) | Adhesive Strength (kg/cm$^2$) | Voltage Withstand (kV/mm) |
| 19 | 215 | 33 | 205 | 27 |
| 20 | 220 | 32 | 190 | 28 |
| 21 | 205 | 30 | 190 | 27 |
| 22 | 200 | 29 | 180 | 26 |
| 23 | 220 | 34 | 200 | 28 |
| 24 | 220 | 31 | 205 | 26 |
| 25 | 215 | 32 | 210 | 29 |
| 26 | 205 | 29 | 180 | 27 |
| 27 | 210 | 30 | 190 | 28 |
| 28 | 218 | 35 | 195 | 30 |
| 29 | 212 | 31 | 180 | 27 |
| 30 | 208 | 28 | 175 | 26 |
| 31 | 206 | 29 | 170 | 25 |
| 32 | 211 | 31 | 177 | 28 |
| Comparative Example 10 | 200 | 28 | 70 | 12 |
| Comparative Example 11 | 170 | 25 | 50 | 9 |
| Comparative Example 12 | 190 | 27 | 60 | 13 |
| Comparative Example 13 | 210 | 29 | 90 | 16 |
| Comparative Example 14 | 160 | 24 | 40 | 8 |
| Comparative Example 15 | 210 | 30 | 0 (Exfoliated) | No measurement could be done |
| Comparative Example 16 | 200 | 33 | 0 (Exfoliated) | No measurement could be done |

As is apparent from the results shown in Table 4 above, the electrically insulative covering 4 according to the present invention exhibits remarkably excellent characteristics after it was subjected to the hot water cycle of 25° C. and 300° C. for five repeated cycles, that is to say, its adhesion strength is 170 kg/cm$^2$ at its minimum value in contrast to 90 kg/cm$^2$ at the maximum vallue in the comparative examples, while its voltage withstand is 25 kV/mm at its minimum value in contrast to 16 kV/mm at the maximum value in the comparative examples. Therefore, the electrically insulative covering according to the present invention is able to meet all the characteristics as mentioned above.

The fourth embodiments of the electrode supporting conduit tube according to the present invention has the electrically insulative covering formed on the outer peripheral surface of the metal conduit tube with a layer of polyether/ether/ketone resin film and a layer of glass fiber impregnated with polyether/ether/ketone resin or polysulfone resin. In the following, actual examples of manufacturing such electrode supporting conduit tube are presented.

EXAMPLE 33

A strip of tape made of polyether/ether/ketone resin film having thickness of 0.10 mm and width of 30 mm was wound half-lap on and around the outer peripheral surface of a metal conduit tube for a single number of winding turn, over which a strip of tape of glass fiber having a thickness of 0.20 mm and a width of 30 mm and with a content of polyether/ether/ketone resin (PES) being 30% by weight was wound half-lap for a single number of winding turn. The winding operations of the tape of polyether/ether/ketone resin film and the tape of glass fiber with the content of polyether/sulfone resin (PES) being 30% by weight were conducted for additional four times, thus repeating the winding operations for five times in all. Over this tape laminations, there was further wound half-lap the polyether/ether/ketone resin film having a thickness of 0.10 mm and a width of 30 mm for a single number of winding turn, thereby forming on the outer peripheral surface of the metal conduit tube a composite layer of polyether/ether/ketone resin and glass fiber impregnated with polyether/sulfone resin (PES) to a thickness of 3.2 mm. Subsequently, the metal conduit tube with this composite layer having been wound therearound was confined in a quartered metal mold, and heated at a temperature of 380° C. under a pressure of 100 kg/cm², thereby forming on the metal conduit tube a covering made of a composite insulating material of polyether/ether/ketone resin and glass fiber impregnated therein with polyether/sulfone resin.

The column for Example 33 in Table 5 indicate the adhesion strength (kg/cm²) and the voltage withstand (kV/mm) of the thus obtained insulating covering at 25° C.; and also the adhesion strength (kg/cm²) and the voltage withstand (kV/mm) of the same insulating covering measured at 25° C. after it was subjected to the hot water test by immersing the insulating member in water, heating it to 300° C., and maintaining the covering in the hot water of 300° C. for 500 hours.

EXAMPLES 34 TO 44

The same experiments as done in Example 33 above were conducted with the exception that the construction and the shaping conditions of the composite insulating layer were varied in accordance with those in Table 5 below, thereby forming the electrically insulative covering on the outer peripheral surface of the metal conduit tube. The characteristics of the thus obtained insulative covering are shown in the columns for Examples 34 to 44 in Table 5.

EXAMPLE 45

The same experiment as done in Example 33 above was conducted with the exception that, in place of the half-lap winding of the glass fiber tape in Example 33, use was made of a glass robing having a thickness of 0.40 mm and with the content of polyether/sulfone resin (PES) of 30% by weight, which was wound in parallel on and around the polyether/ether/ketone resin film, thereby forming the electrically insulating member on the outer peripheral surface of the metal conduit tube. The characteristics of the thus obtained insulating member are shown in the columns for Example 46 in Table 5 below.

COMPARATIVE EXAMPLES 17 TO 25

The same experiments as in Example 33 above were conducted with the exception that the construction or the shaping conditions of the composite insulating layer were varied as shown in Table 5, thereby forming on the outer peripheral surface of the metal conduit tube the electrically insualtive covering under the conditions outside the range of the present invention. The characteristics of the thus obtained insulative covering are shown in the columns for Comparative Examples 17 to 25 in Table 5 below.

As is apparent from the results shown in Table 5, the electrode supporting conduit tube, on and around which the electrically insulative covering according to this fourth embodiment was formed, is excellent in the electrical, mechanical and hot water resistant properties of the insulative covering, hence it is effectively suited as the electrode supporting conduit tube for use in extracting the underground hydrocarbon resources by the electrical heating method.

Although, in the foregoing, the present invention has been described with reference to particular embodiments thereof, it will be understood by those persons skilled in the art that the invention is not limited to these embodiments alone, but is capable of a variety of alternative embodiments within th spirit and scope of the invention as recited in the appended claims.

TABLE 5

| | Structure of Electrically Insulative Covering | | | | | | |
|---|---|---|---|---|---|---|---|
| | | Glass Fiber | | | | Polyether/ether/ketone Resin Film | | Winding Operation |
| Example No. | Shape | Kind of Impregnating Resin | Resin Content (wt. %) | Thickness (mm) | No. of Winding (Times) | Thickness (mm) | No. of Winding (Times) | Repeated Number (Times) |
| 33 | Tape | Polyether/sulfone | 30 | 0.20 | 1 | 0.10 | 1 | 5 |
| 34 | Tape | Polyether/sulfone | 30 | 0.20 | 1 | 0.10 | 1 | 5 |
| 35 | Tape | Polyether/sulfone | 30 | 0.20 | 1 | 0.10 | 1 | 5 |
| 36 | Tape | Polyether/sulfone | 30 | 0.20 | 1 | 0.10 | 1 | 5 |
| 37 | Tape | Polyether/sulfone | 30 | 0.20 | 1 | 0.10 | 1 | 5 |
| 38 | Tape | Polyether/sulfone | 10 | 0.20 | 1 | 0.10 | 1 | 5 |
| 39 | Tape | Polyether/sulfone | 50 | 0.20 | 1 | 0.10 | 1 | 5 |
| 40 | Tape | Polyether/sulfone | 30 | 0.20 | 1 | 0.01 | 10 | 5 |
| 41 | Tape | Polyether/sulfone | 30 | 0.40 | 1 | 0.40 | 1 | 3 |
| 42 | Tape | Polysulfone | 30 | 0.20 | 1 | 0.10 | 1 | 5 |
| 43 | Cloth | Polyether/sulfone | 30 | 0.20 | 1 | 0.10 | 1 | 5 |
| 44 | Mat | Polyether/sulfone | 30 | 0.20 | 1 | 0.10 | 1 | 5 |
| 45 | Robing | Polether/sulfone | 30 | 0.40 | 1 | 0.10 | 1 | 5 |
| Comparative Example 17 | Tape | Polyether/sulfone | 30 | 0.20 | 1 | 0.10 | 1 | 5 |
| Comparative Example 18 | Tape | Polyether/sulfone | 30 | 0.20 | 1 | 0.10 | 1 | 5 |
| Comparative Example 19 | Tape | Polyether/sulfone | 30 | 0.40 | 1 | 0.50 | 1 | 3 |
| Comparative | Tape | Polyamide | 30 | 0.20 | 1 | 0.10 | 1 | 5 |

TABLE 5-continued

| Example No. | | | | | | | |
|---|---|---|---|---|---|---|---|
| Example 20 Comparative Example 21 | Tape | Polycarbonate | 30 | 0.20 | 1 | 0.10 | 1 | 5 |
| Comparative Example 22 | Tape | Polybutylene | 30 | 0.20 | 1 | 0.10 | 1 | 5 |
| Comparative Example 23 | Tape | ABS | 30 | 0.20 | 1 | 0.10 | 1 | 5 |
| Comparative Example 24 | Tape | AB | 30 | 0.20 | 1 | 0.10 | 1 | 5 |
| Comparative Example 25 | Tape | Polystyrene | 30 | 0.20 | 1 | 0.10 | 1 | 5 |

| | Shaping Conditions | | Characteristic Values | | | |
|---|---|---|---|---|---|---|
| | | | Initial Value | | Hot Water Test (after 500 hrs) | |
| Example No. | Temp. (°C.) | Pressure (kg/cm$^2$) | Adhesive Strength (kg/cm$^2$) | Voltage Withstand (kV/mm) | Adhesive Strength (kg/cm$^2$) | Voltage Withstand (kV/mm) |
| 33 | 380 | 100 | 220 | 32 | 205 | 28 |
| 34 | 450 | 100 | 215 | 33 | 200 | 29 |
| 35 | 350 | 100 | 200 | 30 | 180 | 25 |
| 36 | 380 | 10 | 205 | 29 | 185 | 26 |
| 37 | 380 | 200 | 220 | 30 | 205 | 25 |
| 38 | 380 | 100 | 220 | 32 | 205 | 28 |
| 39 | 380 | 100 | 210 | 31 | 185 | 26 |
| 40 | 380 | 100 | 208 | 29 | 170 | 25 |
| 41 | 380 | 100 | 203 | 28 | 175 | 24 |
| 42 | 380 | 100 | 220 | 33 | 205 | 28 |
| 43 | 380 | 100 | 215 | 32 | 200 | 27 |
| 44 | 380 | 100 | 190 | 28 | 180 | 23 |
| 45 | 380 | 100 | 185 | 28 | 170 | 25 |
| Comparative Example 17 | 330 | 100 | 200 | 30 | 70 | 5 |
| Comparative Example 18 | 480 | 100 | 190 | 31 | 60 | 6 |
| Comparative Example 19 | 380 | 100 | 150 | 25 | 50 | 7 |
| Comparative Example 20 | 380 | 100 | 200 | 30 | 5 | 4 |
| Comparative Example 21 | 380 | 100 | 205 | 32 | 10 | 3 |
| Comparative Example 22 | 380 | 100 | 205 | 31 | 6 | 5 |
| Comparative Example 23 | 380 | 100 | 180 | 28 | 5 | 4 |
| Comparative Example 24 | 380 | 100 | 180 | 27 | 5 | 3 |
| Comparative Example 25 | 380 | 100 | 170 | 26 | 4 | 3 |

We claim:

1. An electrode supporting conduit tube for electrical heating above 300° of underground hydrocarbon resources, which comprises: in order a metal conduit tube formed with an advance on the outer peripheral surface by the melt-plating method and where the outer surface is made from the group of metal or metal alloys containing nickel, nickel/aluminum alloy, nickel/chromium alloy, silica/aluminum alloy or silicon; and an insulative covering adhered on and around the outer peripheral surface of said metal conduit tube, said insulative covering being a laminated body of polyether/ether/ketone resin film having a thickness in a range from 0.01 mm to 0.20 mm, and glass fiber having 90% or greater silica content, which is obtained by confining both polyether/ether/ketone film resin and glass fiber wound on and around said metal conduit tube within a metal mold and subjecting said laminated materials to shaping under heat and pressure at a heating temperature of from 350° C. to 450° C. and a pressure of from 10 to 200 kg/cm$^2$ while confining said laminations within said mold.

2. The electrode supporting conduit tube according to claim 1, wherein said polyether/ether/ketone resin film and said glass fiber are alternately wound on and around the outer peripheral surface of said metal conduit tube, and then the thus wound polyether/ether/ketone resin film and glass fiber are confined in a metal mold.

3. The electrode supporting conduit tube according to claim 1, wherein said metal coating is formed of at least one kind of metal material selected from the group consisting of nickel, aluminum, chromium, silicon and iron.